Oct. 29, 1968

R. E. KUBA 3,408,551

CURRENT SPIKE SUPPRESSOR FOR INVERTER

Filed July 23, 1965

INVENTOR
RICHARD E. KUBA

BY  *Misegades & Douglas*

ATTORNEYS

United States Patent Office 3,408,551
Patented Oct. 29, 1968

3,408,551
CURRENT SPIKE SUPPRESSOR FOR INVERTER
Richard E. Kuba, Columbus, Ohio, assignor to North Electric Company, Galion, Ohio, a corporation of Ohio
Filed July 23, 1965, Ser. No. 474,278
4 Claims. (Cl. 321—10)

ABSTRACT OF THE DISCLOSURE

Apparatus for suppressing undesirable current spikes present in circuit components used with transistor type inverter circuits in which an improved control circuit of a parallel combination of rectifier and reactor winding is connected in series with a capacitor so that when the inverter has a low impedance value during commutation of the inverter and in which a capacitor is being discharged, the windings of the reactor absorb the discharge during such commutation and thereby suppress the spike otherwise present.

---

The present invention relates to novel apparatus for suppressing undesirable current spikes which occur in circuit components used with many types of solid state inverter circuits, and more particularly the invention relates to an improved control circuit comprising a parallel combination of rectifier and reactor windings in which the parallel combination is connected in series with a capacitor so that when the inverter has a low impedance value during commutation of the inverter and in which a capacitor or other storage device is being discharged, the windings of the reactor absorb the discharge during such commutation and thereby suppress the current spike that is otherwise present.

The object therefore of the present invention is to provide control means for elimination of the objectionable current spikes that are present and are adapted to flow through the transistor during a commutative or switching period of the inverter.

A further object of the present invention is to provide a new and improved control circuit for current spike suppression to significantly reduce the magnitude of the current spikes so that the transistors or other solid state type components of inverters during the period of switching, gating or commutation thereof do not provide secondary breakdown or failure due to excessive high heat generation in the transistor. The secondary breakdown can occur in a transistor when its collector voltage and collector current simultaneously exceed rated values as are established by transistor manufacturers. Thus, the breakdown is subject to occur when the transistors of the inverters experience simultaneous high voltage and high current because of the large current spike condition usually present during the commutative period of the transistors of the inverter.

A further feature of the invention is that when the transistors of an inverter pass through a period of commutation, such commutation being externally controlled or regulated, all of the transistors are in their ON status simultaneously, and the invention provides a control component for absorbing voltage for the period in which the transistors pass through their period of commutation.

A further object of the invention is to provide a core having windings and a control circuit therefor so that the core is adapted to absorb voltage during the period of commutation of the inverter transistors, resulting in the suppression of spike current which would normally flow through the commutating transistors. Thus the spike currents which would normally flow through the commutating transistors are therefore greatly attenuated or suppressed.

Another object of the invention is to provide simple and effective means for expeditiously suppressing and attenuating current spikes that are present in solid state type inverters during the period in which they are in a low impedance condition.

The above and other objects and advantages of the invention will become apparent upon full consideration of the following detailed description and accompanying drawings in which.

Figure 3:
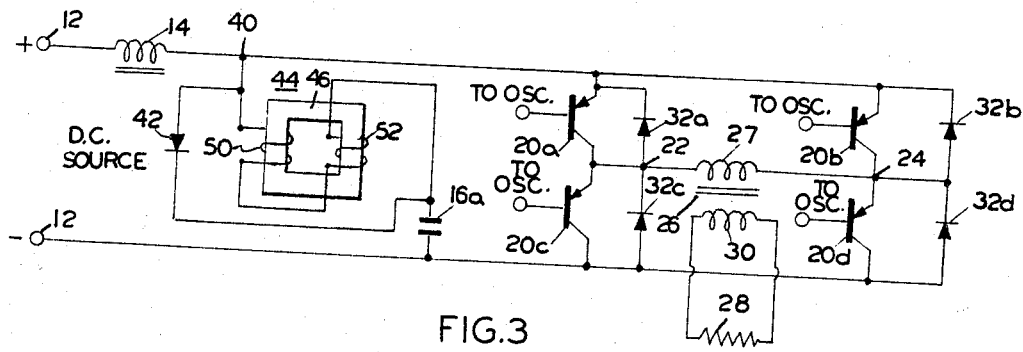
Figure 4:
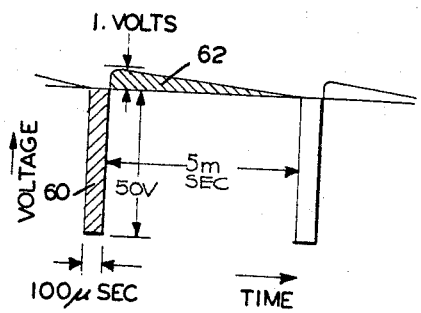

FIGURE 3 shows, in accordance with the best mode and preferred embodiment of the invention, an inverter circuit employing the current spike suppressor control circuit of the invention used with a bridge configuration of transistors forming the inverter circuit; and FIGURE 4 illustrates the wave shape forms which appear across the series combination of windings and across the rectifier forming the control circuit of the invention illustrating the manner in which current spikes are suppressed or attenuated.

Referring now to the drawings, there is shown a solid state inverter circuit 10 having D.C. power terminals 12, 12. From the terminals are shown connected a choke 14 and capacitor 16 comprising a filter network in keeping transients from being applied to the solid state inverter, as well as providing some assurance that transients will not be applied from the solid state inverter to a D.C. source that may be applied at the terminals 12, 12 that may cause deleterious effects.

The solid state inverter 10 is comprised of transistors 20a, 20b, 20c, 20d arranged in a bridge configuration as shown, and intermediate points 22, 24 of the bridge configuration have a transformer 26 with its primary winding 27 connected between these points 22, 24. A load 28 is coupled to the transformer 26 by means of the secondary winding 30.

Rectifiers 32a, 32b, 32c, 32d are connected across transistors 20a, 20b, 20c, 20d, respectively to provide a path in shunt relation to the transistors for the inductive or capacitative reactive current to flow around the transistors in a reverse direction and thus the capacitor 16 is charged. The capacitor 16 is used to maintain the voltage at the input to the transistor bridge of the solid state inverter 10 at a nearly constant value so that no excessive voltages, such as voltage spikes and the like, will be present across the emitter-to-collector terminals of the transistors 20a, 20b, 20c, 20d. If excessive voltages did occur across the emitter-to-collector path of the transistors, the ratings of the transistors would be significantly exceeded and would produce failure of the transistors.

An oscillator (not shown) provided with a common alternating voltage output is connected to the base of transistors 20a and 20d to turn the transistor ON in such a manner as is well known, so that for one-half of a cycle of the oscillator voltage wave, the transistors 20a and 20d are placed in a state of low impedance to the flow of current. During the next half of said cycle of the oscillator voltage wave, the sequence is reversed so that transistors 20b and 20c are placed in a state of low impedance to the flow of current. While transistors 20a, 20d are rendered ON, transistors 20b, 20c are turned OFF and, conversely, while transistors 20b, 20c are rendered ON, transistors 20a, 20d are turned OFF.

Thus by the commutation provided by the oscillator during one-half cycle of the oscillator voltage applied to the bases of transistors 20a, 20b, 20c, 20d, current flows from one terminal 12 connected to the D.C. source through the choke 14, through transistor 20a, primary winding 27, and transistor 20d to the other terminal 12. During the next half-cycle of the oscillator voltage applied to the base of transistors 20b, 20d, current flows from the same one terminal 12 similarly through choke 14 and then through transistor 20b, primary winding 27 in a direction reversed from that of the previous half-cycle, and then through transistor 20c to the other terminal 12. In this manner, an alternating voltage and current is applied to the primary winding 27 of transformer 26, and by conventional transformer action there is produced an alternating voltage and current in the transformer output winding 30 which is applied to the load 28. Load 28 is shown as a resistive load, but may as well have capacitive or inductive components for providing reactive components. Thus it is seen that the solid state inverter circuit 10 produces an alternating current output derived from a direct current input. The purpose of choke 14 is thus seen to maintain a smooth flow of current from the source during the switching of the transistor from ON to OFF modes and to absorb the alternating current voltage generated as a result of the switching operation.

Figure 1:
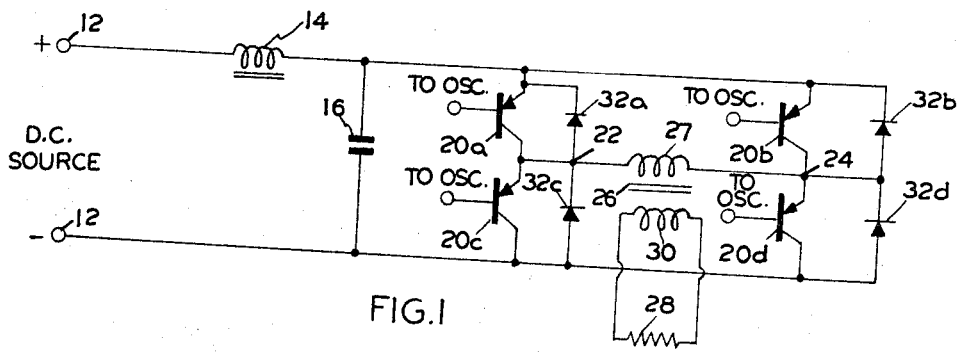
FIGURE 1 is a schematic circuit diagram of a prior art device comprising a transistorized inverter circuit using a bridge configuration of transistors.

While the capacitor 16 is used for maintaining voltage at the input of the transistor bridge of the solid state inverter circuit 10 at a nearly constant value, there are spike current surges that occur across the emitter-to-collector terminals of the transistors as above described, and because of the inherent switching characteristics of transistors, it has been found that the time required to switch a transistor 20a, 20b, 20c, 20d to its ON mode is less than the time required to switch a transistor to its OFF mode. This has been found to be a disadvantage of the circuit arrangement disclosed and described in connection with FIGURE 1, and this particular disadvantage is obviated in the new and improved arrangement as disclosed in connection with the embodiment shown in FIGURE 3. This disadvantage of the circuit of FIGURE 1 is appreciated by example if it be considered that transistors 20a, 20d in FIGURE 1 are in their ON mode and transistors 20b, 20c, are in their OFF mode, during the switching period or commutation interval, transistors 20b, 20c will in general arrive at their ON mode before transistors 20a, 20d have arrived at their OFF mode. This means that for a very short interval or period of time, all four transistors 20, 20b, 20c, 20d are simultaneously in their ON modes. During this commutative period, when all four transistors are in their ON modes, two very low impedance paths to current flow will exist across capacitor 16, one of these paths being made up of transistors 20a, 20c and the other being made up of transistors 20b, 20d. These low impedance paths cause capacitor 16 to partially discharge and produce substantially large current spikes to flow through the transistors, as respectively set out above, incident to the discharge of capacitor 16.

Figure 2A:
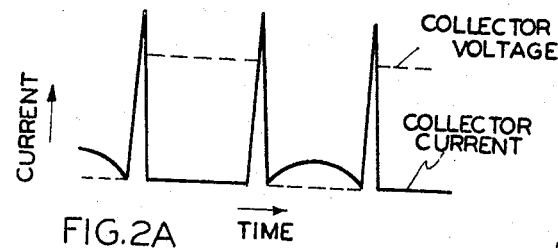
FIGURES 2A and 2B show a wave form diagram of the large collector current spikes which would flow through the transistors during a commutative or switching period.
Figure 2B:
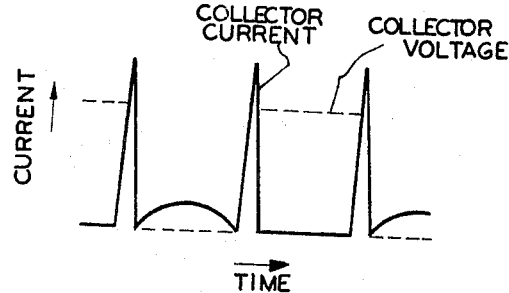

The voltage oscillogram shown in FIGURE 2A shows that the collector current of transistors 20a and 20c is shown of large current spikes at the time of this common commutative, while the collector current and voltage oscillogram of transistors 20b, 20d is shown correspondingly in FIGURE 2B. These large current spikes which flow through the collector electrode of the transistors during the commutative or switching period are very objectionable since they exceed the ratings of the transistors and produce failure thereof, which is often called "secondary breakdown". Secondary breakdown may occur in a transistor when its collector voltage and collector current simultaneously exceed rated values as are defined in rating the transistor by its manufacturer. As is seen in FIGURES 2A and 2B it is seen that the commutative period illustrates that transistors 20a, 20b, 20c, 20d are experiencing simultaneous high voltage and high current due to the large current spike imposed thereon.

In FIGURE 3 there is shown an inverter circuit 10 that is in general correspondent to that of FIGURE 1, and wherein there is also employed a current spike suppressor circuit 40 having a parallel combination of a rectifier 42 and a reactor 44 in a parallel combination which is connected in series with capacitor 16a.

The reactor 44 consists of a laminated magnetic core 46 which may be interleaved or may be of a toroidal construction. The magnetic material comprising core 46 is of a kind which may have a substantially square hysteresis loop, and the core is constructed to minimize the effects of air gaps on the magnetic characteristics of the square loop magnetic material. Although only one winding is essential, there are shown on core 46 wound coils 50, 52, and these coils are connected in a series-aiding manner so that the flux set up by the same current flowing through the coils in series is in the same direction around the magnetic core structure.

As an example of the design of a current spike suppression circuit used in connection with an inverter circuit 10 like that shown in FIGURE 3, the rectifier 42 may be a Westinghouse 304B stud mounted on a square copper flat plate, heat sink measuring 2" on each side and 1/16" in thickness. The reactor 44 may have two identical coils 50, 52 each having 48 turns of No. 16 wire wound in two layers thereon. The core 44 consists of a 3/8" stack-up of DU-1, 6 mil Orthonik lamination.

When the inverter circuit is energized upon connecting to a source of direct current at terminals 12, 12, current flows from one terminal 12 through choke 14, then through rectifier 42 into a capacitor 16a for charging it to approximately the potential of the D.C. source. Since the reactor 44 is connected by the series windings 50, 52 in parallel relation with the rectifier 42, current also flows through the coils 50, 52 for magnetizing the core to a magnetic state of one of its extreme condition of magnetization, or even into saturation in one magnetic direction. The core is then set by its magnetic state to absorb a voltage, as will be shown in connection with describing in FIGURE 4, when current is required to flow through coils 50, 52 in a direction opposite to that described in connection with charging capacitor 16a, that is, the current flow through coils 50, 52 is in a direction opposite to that when the capacitor 16a is discharged and this is due to capacitor 16a being required to discharge. The diode or rectifier 42 acts in addition to the function of a voltage clamp for keeping the voltage across the transistors from exceeding the voltage across capacitor 16a by more than the diode voltage drop when conducting, which is a small voltage on the order of 1 volt, when compared to the typical value of capacitor voltage which is on the order of 50 volts. The function of the capacitor therefore is preserved by the current spike suppressor circuit 40 in preventing excessive voltage from appearing across transistors 20a, 20b, 20c, 20d. When the period of commutation is imposed upon the transistors, the four transistors 20a, 20b, 20c, 20d are in their ON status simultaneously, and capacitor 16a begins to discharge through coils 50, 52. Since the core 44 was previously set at an extreme magnegtic condition, as above described, the core may now absorb this voltage, and the circuit is so designed for absorbing the entire voltage of the D.C. source for a period of approximately 100 microseconds.

This voltage is in opposition to the capacitor voltage, resulting in a net voltage across the transistors being essentially or nearly zero. The spike currents which would normally flow through the commutating transistor are therefore greatly attenuated and therefore suppressed. After approximately 100 microseconds, the core 44 has been driven to its opposite extreme of magnetization and saturates, but by this time the period of commutation impressed on the four transistors is past in time. The capacitor now discharges more of its energy into the load, and then during the next half-cycle of the inverter frequency, as controlled by the oscillator applied to the basis of all four transistors, the capacitor again recharges by receiving more current from the direct current source at terminals 12, 12 through the choke 14 and rectifier 42. This charging action again resets the core 44 to its original extreme state of magnetization and the cycle is then repeated.

There is illustrated in FIGURE 4 the waveforms which appear across the series combination of coils 50, 52, the 100 microsecond period of magnetization being shown by referenced numeral 60, and the period of capacitor recharge being shown by the portion of the waveform identified by referenced numeral 62. The volt-time area of waveform 60 is equal in area to waveform 62 and is essential by fundamental principles of electronics.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. A current spike suppressor circuit for inverters of the transistor type in which such spikes are generated during commutation of the transistor components of the inverter, comprising a choke inductance connecting a source to a terminal of an inverter circuit, a shunt circuit comprising a rectifier and reactor means in parallel relation, said reactor means constructed to minimize the effects of air gaps on its magnetic characteristics, a capacitor in series with said shunt circuit and said reactor absorbing nearly the entire input supply voltage during the commutation interval, said capacitor capable of being charged by a source to a line value, said rectifier providing a voltage clamp in keeping the voltage across the inverter from exceeding the voltage across the capacitor, said inverter having a low impedance value during commutation of the inverter for discharging the capacitor through the reactor means resulting in absorbing the voltage by the discharge current passing through the reactor means.

2. A current spike suppressor circuit for inverters of the transistor type in which such spikes are generated during commutation of the transistor components of the inverter, comprising a choke inductance connecting a source to a terminal of an inverter circuit, a shunt circuit comprising a rectifier and reactor means in parallel relation, said reactor means constructed to minimize the effects to air gaps on its magnetic characteristics, the reactor means having a square hysteresis loop characteristic, a capacitor in series with said shunt circuit and said reactor absorbing nearly the entire input supply voltage during the commutation interval, said capacitor capable of being charged by a source to a line value, said rectifier providing a voltage clamp in keeping the voltage across the inverter from exceeding the voltage across the capacitor, said inverter having a low impedance value during commutation of the inverter for discharging the capacitor through the reactor means resulting in absorbing the voltage by the discharge current passing through the reactor means.

3. A current spike suppressor circuit for inverters of the transistor type in which spikes are found generated during commutation of the transistor components of the inverter, comprising a shunt circuit comprising a rectifier and a circuit of a series of connected reactor windings arranged in parallel relation to the rectifier, said reactor means constructed to minimize the effects of air gaps on its magnetic characteristics, a capacitor being connected in series with the shunt circuit, said reactor windings disposed in series aiding relation on a core and said reactor absorbing nearly the entire input supply voltage during the commutation interval, said core having a square loop characteristic, said capacitor being chargeable to a line voltage, said rectifier keeping the voltage across the inverter from exceeding the voltage across the capacitor, and said capacitor being discharged through the reactor windings for absorbing the voltage of the capacitor, to reverse the magnetization of said core, said discharge voltage being in opposition to and of essentially the same order of magnitude as the line voltage, so that the net voltage across the solid state inverters is nearly zero.

4. A current spike suppressor circuit for inverters of the transistor type in which such spikes are generated during commutation of the transistor components of the inverter, comprising an inverter, a choke inductance connecting a source to a terminal of said inverter, a shunt circuit comprising a rectifier and a series circuit of reactor windings connected in parallel relation to the rectifier, said reactor means constructed to minimize the effects of air gaps on its magnetic characteristics, a capacitor connected in series with said shunt circuit and said reactor absorbing nearly the entire input supply voltage during the commutation interval, said reactor windings wound on a core having square loop characteristics, said capacitor being connected to be charged from a line voltage, said inverter having a low impedance value during commutation of the inverter while discharging the capacitor through the reactor windings resulting in absorbing the voltage by the discharge current passing through the reactor windings.

References Cited

UNITED STATES PATENTS

| | | | |
|---|---|---|---|
| 3,164,767 | 1/1965 | Morgan | 321—45 XR |
| 3,213,287 | 10/1965 | King | 321—45 XR |
| 3,222,587 | 12/1965 | Lichowsky. | |
| 3,262,036 | 7/1966 | Clarke et al. | |
| 3,317,816 | 5/1967 | Wilting | 321—45 |
| 3,321,697 | 5/1967 | Etter | 321—45 |

JOHN F. COUCH, *Primary Examiner.*

WILLIAM SHOOP, *Assistant Examiner.*